Feb. 23, 1971 J. W. JONES ET AL 3,566,392

APPARATUS FOR RECORDING ANALOG DATA IN DIGITAL FORM

Filed Feb. 27, 1967 8 Sheets-Sheet 1

INVENTORS
JACK WEIR JONES
CLARENCE BRAUN
PRESTON E. CHANEY &
JOHN D. BENNETT
BY
Busser, Smith & Harding
ATTORNEYS

APPARATUS FOR RECORDING ANALOG DATA IN DIGITAL FORM

Filed Feb. 27, 1967

INVENTORS
JACK WEIR JONES
CLARENCE BRAUN
PRESTON E. CHANEY &
JOHN D. BENNETT

BY Busser, Smith & Harding
ATTORNEYS

APPARATUS FOR RECORDING ANALOG DATA IN DIGITAL FORM
Filed Feb. 27, 1967 
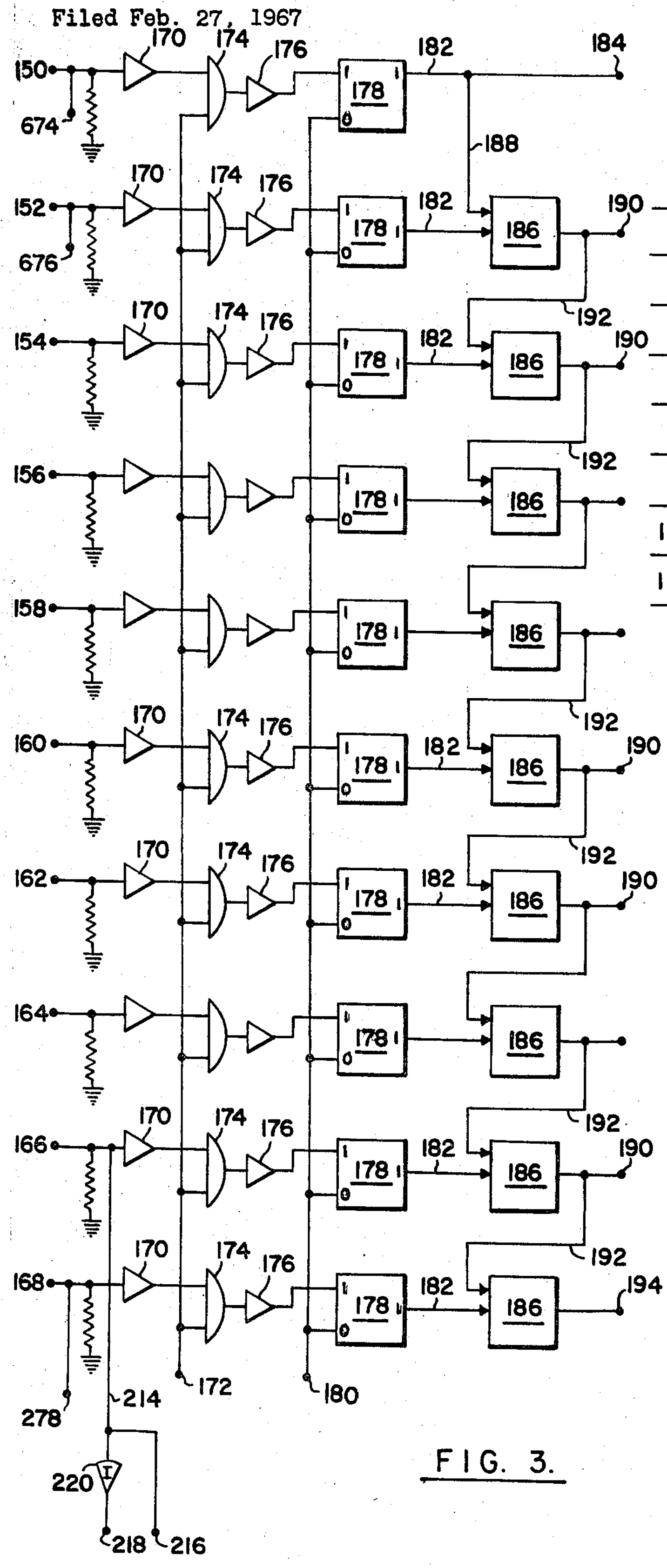
FIG. 3.
| DEC | GRAY | BINARY |
|---|---|---|
| 0 | 0000000000 | 0000000000 |
| 1 | 0000000001 | 0000000001 |
| 2 | 0000000011 | 0000000010 |
| 3 | 0000000010 | 0000000011 |
| 4 | 0000000110 | 0000000100 |
| 443 | 0101100110 | 0110111011 |
| 1022 | 1000000001 | 1111111110 |
| 1023 | 1000000000 | 1111111111 |
FIG. 4.
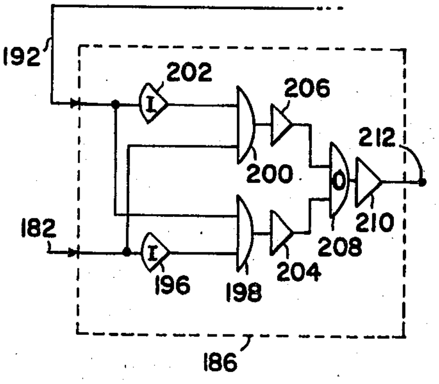
FIG. 10.
INVENTORS
JACK WEIR JONES
CLARENCE BRAUN
PRESTON E. CHANEY &
JOHN D. BENNETT
BY
Busser, Smith & Harding
ATTORNEYS Feb. 23, 1971 J. W. JONES ET AL 3,566,392

APPARATUS FOR RECORDING ANALOG DATA IN DIGITAL FORM

Filed Feb. 27, 1967 8 Sheets-Sheet 4

APPARATUS FOR RECORDING ANALOG DATA IN DIGITAL FORM

Filed Feb. 27, 1967

INVENTORS
JACK WEIR JONES
CLARENCE BRAUN
PRESTON E. CHANEY &
JOHN D. BENNETT
BY
Busser, Smith & Harding
ATTORNEYS

APPARATUS FOR RECORDING ANALOG DATA IN DIGITAL FORM

Filed Feb. 27, 1967 8 Sheets-Sheet 6

INVENTORS
JACK WEIR JONES
CLARENCE BRAUN
PRESTON E. CHANEY &
JOHN D. BENNETT
BY
Busser, Smith & Harding
ATTORNEYS INVENTORS
JACK WEIR JONES
CLARENCE BRAUN
PRESTON E. CHANEY &
JOHN D. BENNETT
BY Busser, Smith & Harding
ATTORNEYS United States Patent Office 3,566,392
Patented Feb. 23, 1971

3,566,392
APPARATUS FOR RECORDING ANALOG DATA IN DIGITAL FORM

Jack Weir Jones and Clarence Braun, Richardson, Preston E. Chaney, Dallas, and John D. Bennett, Richardson, Tex., assignors to Sun Oil Company, Philadelphia, Pa., a corporation of New Jersey Filed Feb. 27, 1967, Ser. No. 618,773
Int. Cl. H03k *13/02*
U.S. Cl. 340—347 10 Claims

ABSTRACT OF THE DISCLOSURE

This apparatus translates a mechanical function into an electrical signal which is in such a form that it can be recorded on magnetic tape and operated on by a digital computer. The apparatus includes a tracking device including shaft encoders operated in response to the position of a stylus so that their outputs correspond to X and Y coordinates, respectively, of the position of the stylus. The shaft encoder outputs are delivered through gates to a code translating circuit from which outputs are selected in groups and delivered sequentially to a magnetic tape recording circuit. A selectable amount of movement of one of the encoders initiates operation of a main control counter from which outputs are taken to control the circuitry by which groups of outputs are sequentially selected and delivered to the recording circuit. The tape transport mechanism is controlled by the main control counter as are the gates associated with the shaft encoder outputs. Means are provided for manual introduction of either X or Y data or both in place of data derived through the encoders. A circuit is provided by which the range of the X encoder is extended by counting the number of its rotations.

BACKGROUND OF THE INVENTION

This invention relates to digitizers and relates particularly to an apparatus which translates a mechanical function into an electrical signal which is in such a form that it can be recorded on magnetic tape and operated on by a digital computer.

An apparatus of this sort has particular utility in the analysis of data recorded in the form of curves on a strip chart. The curves can be traced manually with the use of a tracing head, and the rectangular coordinates of any point on a curve can be translated instantaneously into electrical signals by the use of shaft encoders linked to the tracing head. Such charts might be produced in great numbers by a well logging apparatus, for example, and the great volume of data thus obtained necessitates the use of some means to facilitate analysis. An operator can trace a curve much more quickly than he can record data from the curve by the usual manual methods, and the data obtained by following the curve with a tracing head is in many instances more reliable and more useful than data read from the curve and stored mentally for the interval between reading and recording.

SUMMARY OF THE INVENTION

The apparatus in accordance with the invention can be used wherever it is desired to record numerical data in a computer format, and the data can be derived from any source which provides an output at a plurality of terminals in any binary code. Although the apparatus will be described only in a particular embodiment adapted to operate on gray code data obtained from two shaft encoders, it is to be understood that the input may be in many forms and may be obtained from other sources than shaft encoders and that these sources may appear in number other than two.

The recording apparatus makes use of seven tracks on a magnetic tape, one track being for a parity check. The magnetic states of the six remaining tracks are affected simultaneously during a "write" operation, six bits being recorded simultaneously. For the purpose of recording simultaneous X or Y data, that is, the X and Y values for a given point on a curve, where the X or Y data may have a range of up to twelve bits, a "write" cycle comprising four sequential write operations is used. Sequentially operated gates cause higher order X data to be recorded during the first "write" operation, then lower order X data, higher order Y data and lower order Y data in that sequence. A means is provided for causing the tape to move past the recording heads in synchronism with the "write" operation. The recording of particular value of X, for example, requires two "write" operations, and consequently part of the information necessary to determine the particular value of X appears at one position on the tape, and the remainder of the information appears at another position on the tape which is adjacent but separated from the first position. Each position on the tape at which information appears is a "line of information." Four such lines are produced during each "write" cycle, two lines being X data and the other two being Y data.

The data is obtained from shaft encoders which are preferably of a type having a ten-bit output and which utilize a reflected binary code system in which one and only one digit of the code changes in proceeding to a next higher or next lower number. Such a code is easily translated into the standard binary form by the use of NOT AND logic modules, the translation being necessary since, for computer handling, the data must be in the ordinary binary form.

In accordance with this invention, the curve may be traced rapidly and the tracing process may be interrupted according to the desire of the operator without affecting the record on the magnetic tape. To this end, a signal is derived from the X encoding means which triggers operation of the recording tape transport mechanism. The transport mechanism accurately positions the tape to receive the four lines of information received during each write cycle.

An important feature of the invention is the mode selector, which permits data to be recorded manually on the magnetic tape. X-data can be recorded manually while Y-data is obtained from the curve being traced, and vice-versa. For purposes of calibration, it is possible to record both X and Y data manually. This latter mode may also be useful where it is desired to record data in addition to that obtained from the shaft encoders.

In accordance with the invention, it is possible to extend the range of the X-data without affecting the resolution of the X-data. The range extension is accomplished by the provision of a pulse generator which produces outputs whenever the output of the X encoder passes between its minimum or maximum value. A pulse is produced at one output of the generator when the passage is in one direction, and a pulse is produced at another output when the passage is in the other direction. The pulse generator operates in conjunction with a logic circuit and a counter which adds two binary bits to the information already provided by the X encoder. Thus, merely by counting the number of rotations of the X shaft encoder, the range of the X-data is multiplied by a factor of 4.

The objects of the invention are to provide a digital record of analogue data in a format compatible with digital computer operation, and to provide an apparatus for deriving digital data from an analogue curve which is simple in construction and easy to operate.

Other objects will be apparent from the following description read in conjunction with the accompanying drawings, in which:

BRIEF DESCRIPTION OF THE DRAWINGS

FIG. 3 is a schematic diagram of a code converter used in accordance with this invention;

FIG. 4 is a table illustrating the operation of the code converter of FIG. 3;

FIG. 10 is a schematic diagram showing details of the NOT AND circuits of FIG. 3.

DESCRIPTION OF THE PREFERRED EMBODIMENT

Figure 2:
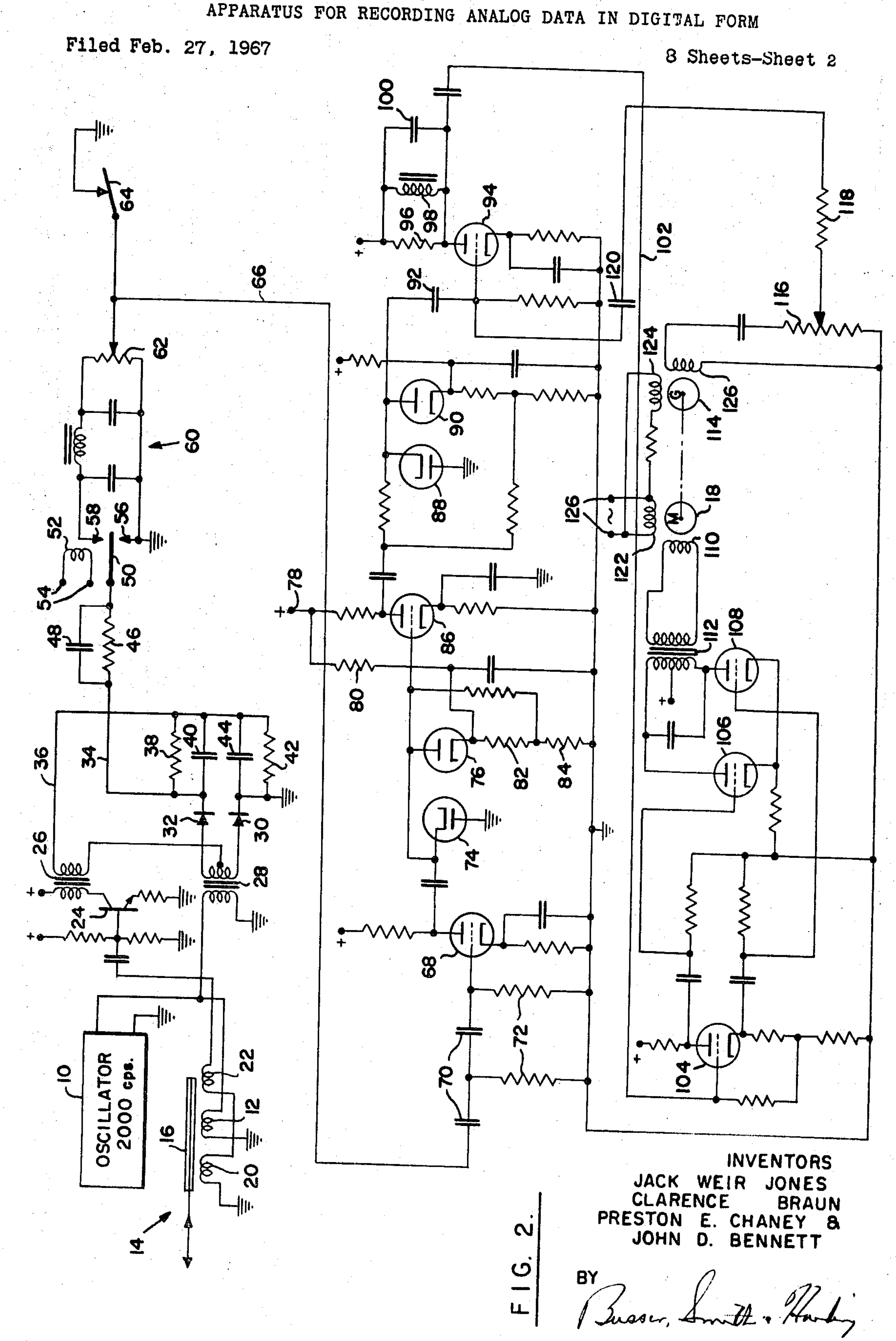
FIG. 2 is a schematic diagram of part of the circuitry associated with the curve tracking apparatus.

Referring to FIG. 2, an oscillator 10 is shown delivering alternating current at 2,000 cycles to the primary winding 12 of a differential transformer generally indicated at 14. Differential transformer 14 is a sensing device for the curve tracking apparatus, and is ideally mounted on a carriage arranged to be moved in any direction in a plane above and parallel to the plane of the chart on which is the curve to be traced. It will be understood that there are two such differential transformers, one being for the X direction, and the other being for the Y direction, and only one such differential transformer is illustrated with its associated circuitry, since both the X and Y systems can be identical.

The armature 16 of the differential transformer is arranged to be moved in response to manual actuation by an operator tracing a curve. A shaft of motor 18 drives the carriage along one axis in its plane of movement in a direction to nullify the error signal resulting from the displacement of armature 16 of the differential transformer. The system is thus a follow-up system which operates in two dimensions.

The secondary windings 20 and 22 of the differential transformer are connected in series, and an output is delivered to a preamplifier comprising transistor 24. The output of the preamplifier is derived through a transformer 26 in the collector circuit of transistor 24. The output of oscillator 10 is delivered also to the primary winding of transformer 28. One terminal of the secondary of transformer 26 is connected to a center tap in the secondary of transformer 28. One of the remaining terminals of the secondary of transformer 28 is connected through a diode 30 to ground, and the opposite terminal is connected through diode 32 to the output line 34. A terminal of the secondary of transformer 26 is connected through line 36, and through the parallel combination of resistor 38 and capacitor 40 to line 34. Line 36 is also connected to ground through the parallel combination of resistor 42 and capacitor 44.

The circuitry just described acts as a phase-sensitive detector, delivering direct current of one polarity through line 34 if armature 16 of the differential transformer is displaced in one direction, and in the opposite polarity if armature 16 is displaced in the opposite direction. The voltage in line 34 is dependent on the extent of the displacement of the armature.

Line 34 is connected through resistor 46 and capacitor 48 to a movable member 50 of a magnetically operated switch, which includes coil 52, which is energized by alternating current applied to terminals 54. The frequency of this alternating current is the same frequency necessary to operate motor 18, and the operation of the switch is such that member 50 is caused to vibrate at this frequency. The output of the phase-sensitive detector is thus connected alternately to terminals 56 and 58. Terminal 56 is grounded and terminal 58 is connected through a smoothing filter indicated generally at 60 to the fixed terminals of a potentiometer 62.

The wiper of potentiometer 62 is connected through switch 64 to ground. Switch 64 may be foot-operated, and is opened during the actual operation of the apparatus.

Potentiometer 62 is a gain control, and pulses are delivered through its wiper and through lines 66 to the input of a servo-amplifier. These pulses may be of either polarity depending on the direction of displacement of the armature of differential amplifier 14. A change of polarity of these pulses results in a 180° shift in the phase of the output of the servo-amplifier, and effects a reversal of the direction of rotation of motor 18.

The signal in line 66 is delivered to the grid of amplifier 68 through a network comprising capacitors 70 and resistors 72. The output of amplifier 68 is clamped by diode 74, and is clipped by diode 76, which is made to conduct when the voltage appearing at its anode is more positive than the voltage derived from the supply terminal 78 through resistor 80, which is connected through a voltage dropping circuit comprising resistors 82 and 84 to ground.

The output of amplifier 68, after having been clipped is delivered to the input of an amplifier comprising vacuum tube 86, and its output is similarly clamped and clipped by diodes 88 and 90, respectively. The signal is subsequently fed through capacitor 92 to the input of a tuned amplifier comprising vacuum tube 94. This amplifier has, in its plate circuit, the parallel combination of resistor 96, inductor 98, and capacitor 100, which causes the frequency response of the amplifier to peak around the operating frequency of motor 18.

The output of the tuned amplifier is delivered through line 102 to the input of a driving amplifier comprising vacuum tube 104, which drives a push-pull amplifier comprising vacuum tubes 106 and 108, which, in turn, drive one field winding 110 of motor 18 through transformer 112.

The output shaft of motor 18 drives a rate generator 114, which provides feedback through the wiper of potentiometer 116, and through resistor 118 and capacitor 120 to the grid of vacuum tube 94. Field windings 122 of motor 18 and 124 of generator 114 are energized by alternating current supplied to terminals 126.

In the operation of the apparatus just described, if armature 16 of differential transformer 14 is displaced in one direction, the voltage appearing at the secondary of transformer 26 is in phase with the voltage appearing between the center tap of the secondary of transformer 28 and the side of the secondary connected to the anode of diode 32. These voltages add to each other, and during positive half-cycles, diode 32 conducts, producing a current through resistor 38. The voltage in the secondary in transformer 26 is out of phase with the voltage appearing between the center tap of the secondary of transformer 28 and the side of transformer 28 which is connected to the anode of diode 30. These voltages subtract from each other, and during positive half-cycles of the difference, diode 30 conducts, causing a current in resistor 42. Under these conditions, the voltage appearing in line 34 is positive with respect to ground, and is filtered DC, since capacitors 40 and 44 act to smooth the half-wave pulses.

If armature 16 is moved in the opposite direction with respect to a neutral position, the circuit operates in a similar manner to produce a negative voltage in line 34, Arm 50 vibrates in synchronism with the voltage applied to terminals 54. If the signal in line 34 is negative, negative pulses appear in line 66, their time of appearance being determined by the vibration of arm 50. If, on the other hand, the signal in line 34 is positive, positive pulses appear in line 66 in exactly the same phase relationship with the supply voltage applied to energizing coil 52. Since the time of appearance of these pulses in line 66 is dependent only on the chopping action of vibrator arm 50, pulses of one polarity can be made to produce an AC voltage which is 180° out of phase with respect to the AC voltage produced by pulses of the opposite polarity. The phase of the AC current in winding 110 of motor 18 is dependent on the polarity of these pulses. That is, the current in winding 110 may lead the current in winding 122 by 90° if the pulses are of one polarity, and the current in winding 110 will lag the current in winding 122 with pulses of the opposite polarity.

The feedback to the grid of vacuum tube 94, which is derived from winding 126 of generator 114 provides damping for the system. The degree of damping is controlled by varying the amount of feedback by potentiometer 116. The gain of the system is controlled by potentiometer 62, which varies the input to the servo-amplifier.

In this invention, there are two circuits of the type shown in FIG. 2. One circuit controls the movement of the carriage over the chart in the X direction, and the other circuit controls movement in the Y direction. The differential transformers are linked in a suitable manner to a tracing stylus by which an operator follows a curve on the chart. By the use of this system, the carriage may be made to move in response to actuation by displacement of the stylus, and in the direcion of movement of the stylus.

Figure 1:
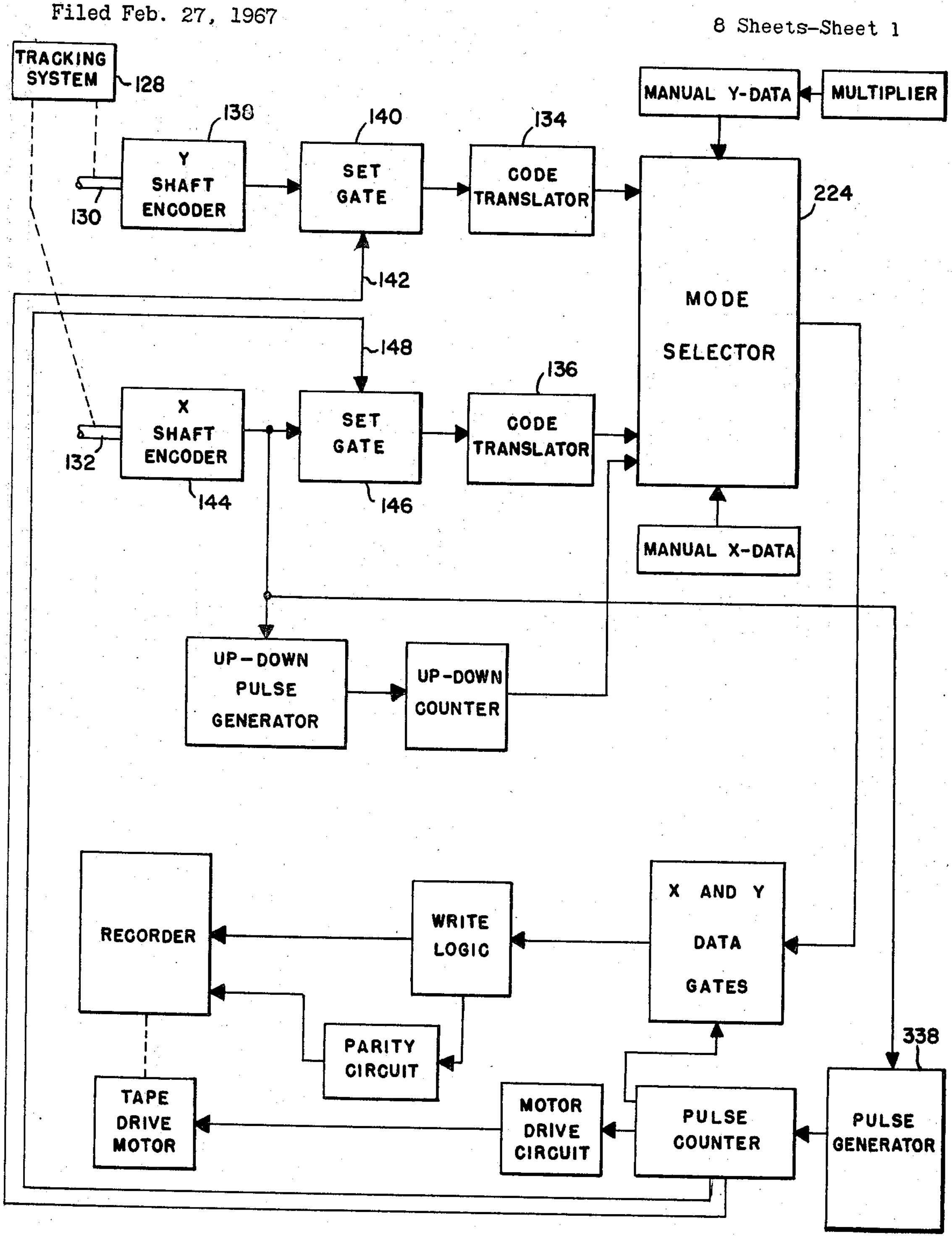
FIG. 1 is a block diagram of the entire apparatus in accordance with this invention.

Referring to FIG. 1, a tracking system 128, which comprises a pair of circuits of the type shown in FIG. 2, is shown linked in such a way as to drive the input shafts 130 and 132 of a pair of shaft encoders. These linkages may be in the form of gears transmitting power to the shaft encoders from the carriage driving motors, or they may be of any suitable form which causes the encoder input shafts 130 and 132 to correspond to the position of the carriage over the chart.

The purpose of the shaft encoders is to translate the data appearing on the chart in analogue form to a digital form. The encoders are preferably of the ten bit gray code type. Each encoder has ten output lines, any number of which may be energized depending on the position of the input shafts. The details of the encoders are not shown siince they are well known and are commercially available. The gray code is used because it has the property that one and only one digit changes in proceeding to the next higher or next lower number. This characteristic of operation eliminates the ambiguity which might occur in the output of an encoder operating in another code system, for example, standard binary, where several digits may change in proceeding from one number to the next. If the digits do not change exactly simultaneously, an erroneous signal appears for an instant at the output. The relationship between the decimal system, and the binary code and gray code is illustrated in FIG. 4. In accordance with this invention, it is necessary to cause the gray code output of the shaft encoders to be converted to the standard binary code, so that the data can be handled by a digital computer. The code translators 134 and 136 shown in FIG. 1 perform this operation.

The output of the Y shaft encoder 138 is delivered to code translator 134 through a set gate 140, which permits the data to be translated only when a triggering pulse is received by gate 140 through line 142. X shaft encoder 144 is similarly connected to code translator 136 through set gate 146 which receives a triggering pulse through line 148.

The relationship between the standard binary code and the gray code is illustrated in FIG. 4, which relates certain selected numbers in decimal form to their gray and binary equivalents. The corresponding gray and binary forms are shown including 10 digits. In the gray code, in proceeding in either direction between successive numbers, it will be noted that only one digit of the code changes. For example, in proceeding from 1 to 2, the second to the last digit of the gray equivalent changes from 0 to 1, while, in the binary equivalent, both of the last two digits change. Because of this characteristic, the gray code is particularly useful in shaft encoders since it results in the prevention of indefiniteness in the output of the encoder.

The relationship between the gray and binary code is simple. In the gray code the most significant digit is the same as the most significant digit of the corresponding binary number. If a comparison is made between the most significant digit and the next most significant digit of the gray number, the second most significant digit of the binary number is 1 if the first and second digits of the gray number are unlike, and is 0 if the first and second digits of the gray number are alike. The second most significant digit of the binary number is then compared with the third digit of the gray number. Again, if they are alike, the third digit of the binary number is 0, and if they are unlike, the third digit of the binary number is 1. If this procedure is continued toward the least significant digit of the gray number, the binary number can be determined. For example, 1023 is, in the gray code, 1000000000. Here, the binary equivalent must contain all ones.

The circuit of FIG. 3 performs the translation between the gray code and the binary code. Ten terminals numbered 150 through 168 receive data in gray code from ten terminals of X-shaft encoder 144 (shown in FIGS. 1 and 5), the most significant digit being applied to terminal 150, and less significant digits being applied, in order, to terminals 152 to 168. Each of these terminals is connected to the input of amplifiers 170, and the output of each amplifier is connected to an input terminal of a two-terminal AND-gate 174. The AND-gates referred to in this specification are of a commonly known type by which a "1" or energized output is produced only when all of its inputs are energized and a "0" or unenergized output is otherwise produced. The second terminal of each AND-gate is connected to a terminal 172, which as will be discussed later, receives a controlling signal which permits the AND-gates to be opened simultaneously to deliver their respective signals through amplifiers 176 to input terminals of flip-flops 178. Each of flip-flops 178 has two inputs and one output. The inputs will be referred to as "1" and "0," and the outputs as "1." The operation is such that if the "1" input receives a pulse, the "1" output will be energized and if the "0" input receives a pulse, the "1" output will be de-energized. The terminals of the flip-flops in this apparatus are marked accordingly. Each flip-flop 178 is associated with a particular AND-gate 174. A resetting signal applied to terminal 180 is connected to reset all the flip-flops 178 simultaneously through their "0" inputs. The operation of the flip-flops is such that an output line 182 is energized whenever the corresponding flip-flop 178 receives a signal at its "1" input through its associated amplifier 176, and all lines 182 are deenergized whenever a resetting signal is applied to terminal 180.

The output of the uppermost flip-flop 178 is fed directly to terminal 184. The outputs of the other flip-flops are delivered through lines 182 to inputs of corresponding NOT AND modules 186. The output of the first flip-flop 178 is fed through line 188 to a second input of NOT AND module 186. The outputs of intermediate NOT AND modules 186 are delivered to terminals 190, and through lines 192 to the second inputs of adjacent NOT AND modules. The output of the last NOT AND module is delivered only to terminal 194.

Referring to FIG. 10, the elements of NOT AND module 186 are shown including input lines 182 and 192. Input line 182 is connected through inverter 196 to an input of AND-gate 198. Inverters throughout this apparatus are designated by the letter I. Line 182 is also connected directly to an input of AND-gate 200. Line 192 is similarly connected through inverter 202 to a second input of AND-gate 200, and directly to a second input of AND-gate. The outputs of AND-gates 198 and 200 are amplified by amplifiers 204 and 206, respectively, and are delivered to inputs of OR-gate 208, the output of which is amplified by amplifiers 210 and delivered to output terminal 212. The OR-gates referred to in this specification are designated by the letter "O" and are conventional and produce a "I" or energized output when either or both of the inputs are energized and produce a "0" or unenergized output only when both inputs are 0 or unenergized. The inverters are likewise conventional devices which produce a "1" output with a "0" input and a "0" output with a "1" input.

From the construction of NOT AND gate 186, it is readily seen that like inputs to input terminals 182 and 192 produce a "0" output in terminal 212. Unlike inputs produce a "1" output. Referreing to FIG. 3, it can be seen how the translation from the gray to the binary code is accomplished. For example, if the input terminals 150 to 168 is 0101100110. The output terminals 184, 190 and 194 of the translating apparatus will be 0110111011 in order.

A line 214 connects the ninth digit terminal 166 to terminal 216. Terminal 218 is connected to terminal 166 through inverter 220. Terminals 218 and 216 connect to a scale selector switch which will be described subsequently. These terminals provide a signal which enables the apparatus to record data, and this signal will be referred to subsequently as a "digitizing" signal. The digitizing signal derived from the ninth digit of the X-encoder occurs every fourth digit since the ninth digit of the gray code changes every fourth digit. A change in either direction causes the production of a digitizing signal.

Figure 5:
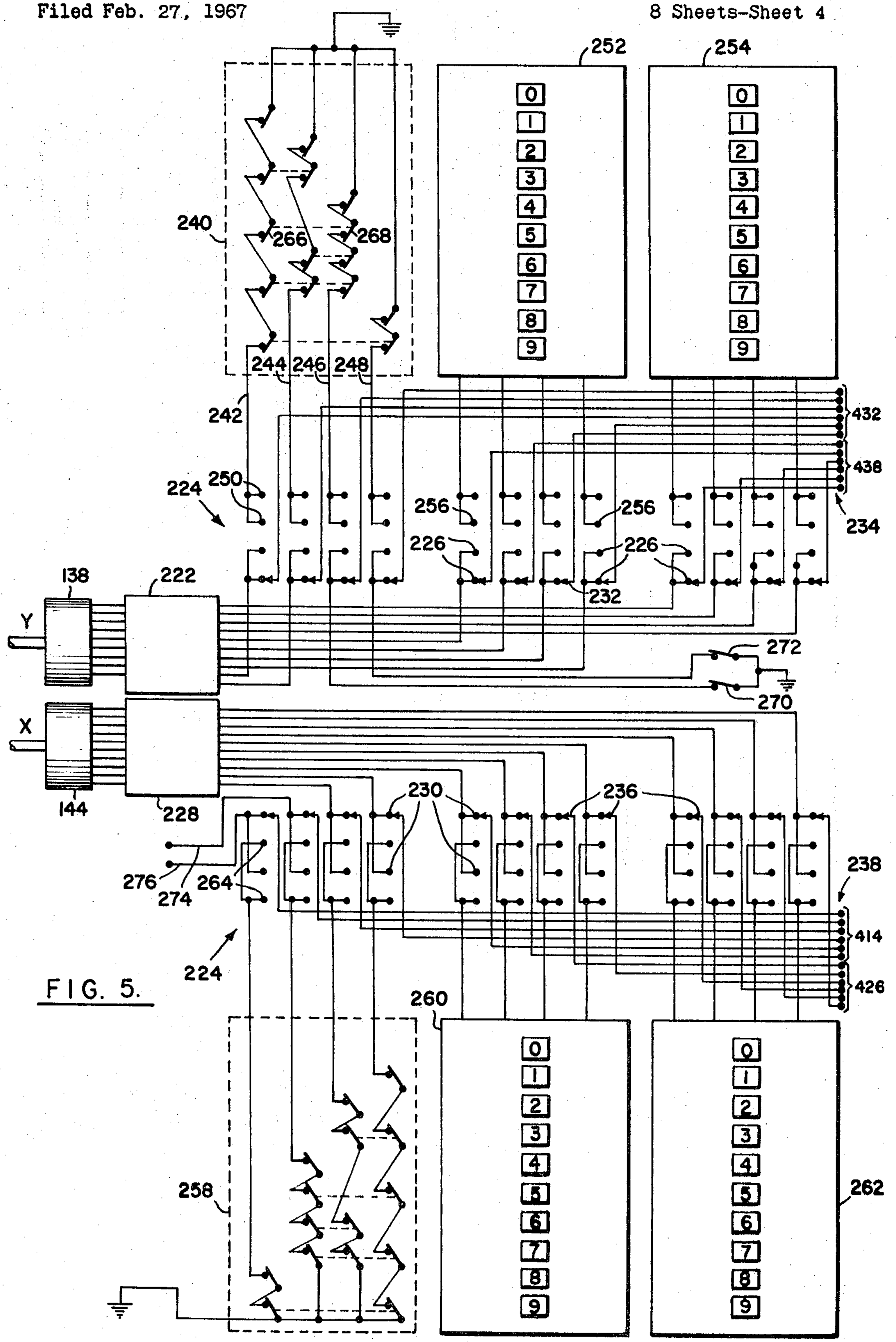
FIG. 5 is a schematic diagram of the mode selection switch, and includes an illustration of the manual means for introducing data into the apparatus, and also includes an illustration of the X and Y shaft encoders.

Referring to FIG. 5, X and Y encoders 144 and 138, respectively, are shown with connections to their respective set gate and translator networks, which are identical except that the set gate and translator 222 associated with the Y-encoder 138 has no connection providing a digitizing signal.

Each network provides ten outputs which deliver information in binary code to terminals of a multiple bank mode selector switch 224. The outputs of network 222 (which includes set gate 140 and code translator 134) are connected to first and second terminals 226 of the Y-data banks of switch 224. The outputs of network 228 (which includes set gate 146 and code translator 136) are connected to terminals 230 of the X-data banks switch 224.

Switch 224 is shown in FIG. 5 as having two sections the upper section being for Y-data and the lower for X-data. It is a single 4-position switch having twenty-four banks and having a single control.

The twelve wipers 232 of the upper part of the switch are connected respectively to twelve output terminals through lines 234. Wipers 236, of the lower part of switch 224, are connected, respectively, to output terminals through lines 238. The operation of switch 224 is such that wipers 232 and 236 operate in tandem, and wipers 232 and 236 are shown in a first position of the switch. Three other positions are possible, and when wipers 232 move in the upward direction, wipers 236 move in the downward direction to contact corresponding terminals.

A bank 240 of push-button switches is shown having output lines 242, 244, 246 and 248 connected to terminals 250 of switch 224. Similar banks 252 and 254 are shown having lines connected to corresponding terminals 256 of the upper section of switch 224. Similar banks 258, 260 and 262 have lines connected to corresponding terminals 264 of the lower section of switch 224.

Bank 240 contains switches which are arranged to be opened by the depression of push-buttons. Accordingly, buttons marked from 0 to 9 are provided on each bank. These banks are used to insert numerical data in binary-decimal form onto the recording tap manually, and banks 240, 252 and 254 insert Y-data, and banks 258, 260 and 262 insert X-data. The buttons marked "0" make no electrical connections, but are arranged so that, when depressed, they cause all of the other buttons in the corresponding bank to be raised by the use of a conventional mechanical system of the type used extensively in adding machines and the like.

Each of the four lines between a bank and switch 224 is normally grounded through the various contacts within the bank. To illustrate the operation of the bank, suppose the push-button (not shown) marked five on bank 240 is depressed. Contacts 266 and 268 will be opened so that lines 242 and 246 are disconnected from ground while lines 244 and 248 remain grounded. Assuming that none of the contacts within banks 252 and 254 is opened, the value which is represented is five hundred. If switch 224 is in a position such that wipers 232 are in contact with the upper contacts 250 and 256 of the switch, output lines 234 will be energized in such a manner that the number recorded corresponds to the push-buttons depressed.

X-data can be similarly inserted on the tape by the use of the push-button on banks 258, 260 and 262. Switch 224 must, however, be in its second or fourth position so that wipers 236 come in contact with contacts 264 if the manually inserted data is to be deliverd through lines 238.

Switch 224 being shown in its first position, the signals delivered through lines 234 correspond to Y-data derived from shaft encoder 138, and the signals delivered through line 238 correspond to X-data derived from shaft encoder 144. If mode selector switch 224 is in its second position, the output through lines 234 and 238 is automatic Y-data and manual X-data. If switch 224 is in its third position, the output through lines 234 and 238 is manual Y-data and automatic X-data. If switch 224 is in its fourth position, the data delivered through lines 234 and 238 is entirely manually derived.

As mentioned previously, the manual insertion of data is desirable for purposes of calibration, and also for the purpose of recording additional data on the recording tape for computer use. At the beginning and at the end of each period of manual data insertion a code number is inserted on the recording tape by depressing certain push-buttons so that the computer which subsequently derives data from the tape, and which is programmed to recognize certain code numbers can interpret the X and Y data in the proper coding system, either binary or binary-decimal.

Switches 270 and 272 are manually operated, and can be used to insert data on the tape in addition to that which is provided by the Y shaft encoder 138. In practice, these switches may be used as multipliers to insert a signal on the tape which can be interpreted by a suitably programmed computer as representing a multiplication of the data by 10 or 100.

Lines 274 and 276 receive signals from a range extension circuit which will be described. This range extension circuit functions as a counter to count the number of revolutions of the X encoder 144. The counter sends two additional bits of information through lines 274 and 276, and through the contacts of switch 224 to lines 238. The range extension permits four rotations of the shaft of the X encoder 144 where otherwise only a single rotation would be permitted.

Figure 6:
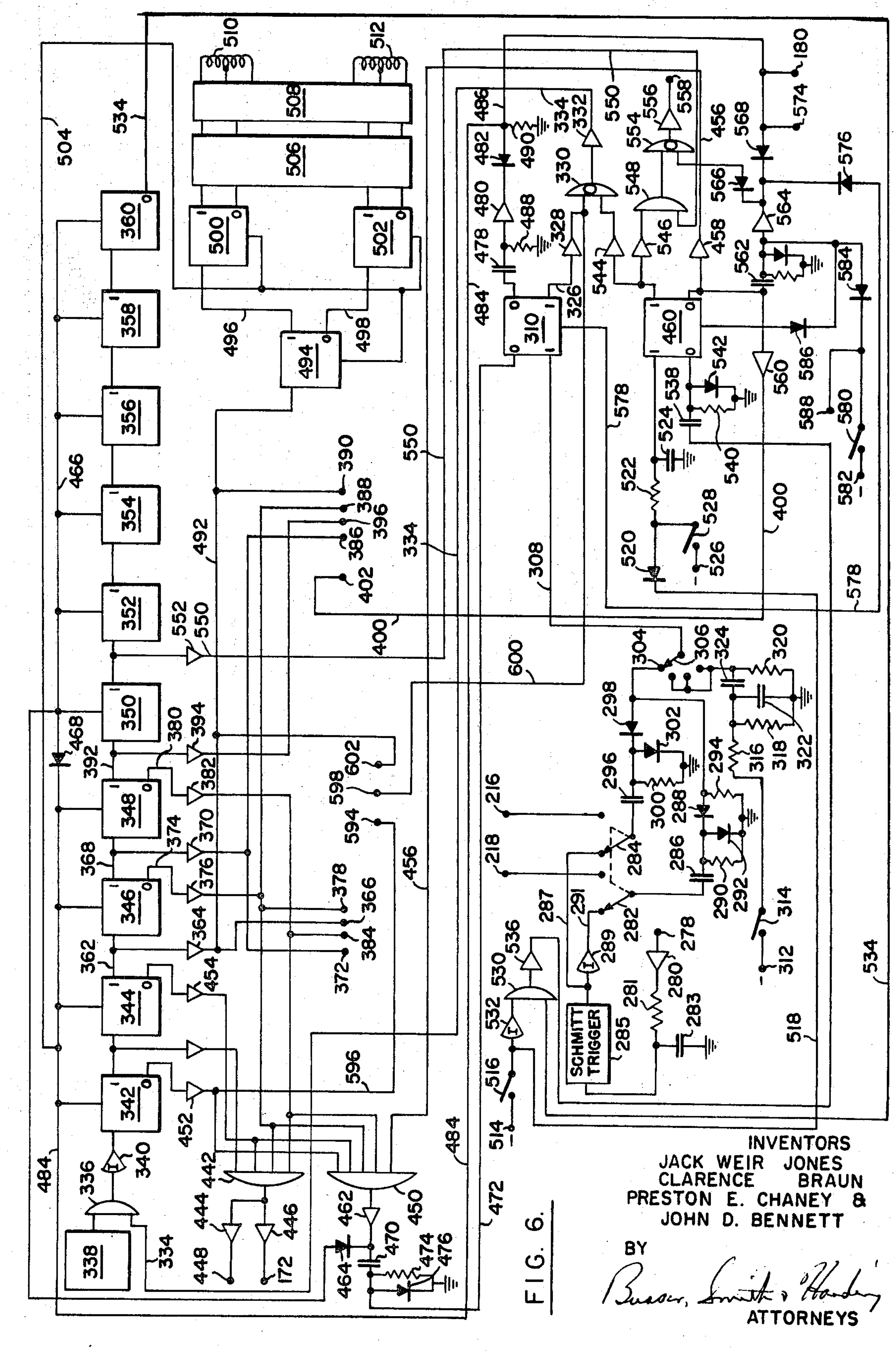
FIG. 6 is a schematic diagram of the control circuitry in accordance with the invention.

Referring to FIG. 6, a pair of terminals 216 and 218 is shown. These terminals are shown also in FIG. 3. They receive signals from the second digit terminal of the X encoder. The second digit terminal of the X encoder changes state once for every fourth integer, and a digitizing signal is thereby provided either at terminal 216 or at terminal 218.

Terminal 278 is connected to the lowest order terminal of the X encoder and is shown in FIGS. 3 and 6. Amplifier 280 receives the digitizing signal at terminal 278, and passes it through an integrating circuit comprising resistor 281 and capacitor 283 to Schmitt trigger 285. The output of the Schmitt trigger is delivered to line 287 directly, and through inverter 289 to line 291. A switch comprising wipers 282 and 284 is provided in order that the desired rate of occurrence of the digitizing signal may be chosen by connection of the wipers to lines 291 and 287 respectively for a high rate of occurrence of the digitizing signal onto terminals 218 and 216 for a lower rate of occurrence. Wiper 282 is connected through capacitor 286, and through diode 288 to terminal 304 of four-position switch 306. Resistor 290 and diode 292 are connected between the cathode of diode 288 and ground, and resistor 294 connects the anode of diode 288 to ground. Wiper 284 is connected through capacitor 296, and through diode 298 to terminal 304. The cathode of diode 298 is connected to ground through diode 302 and resistor 300.

If the wiper of switch 306 is connected to terminal 304, a negative signal appears in line 308 whenever a digitizing signal appears at wiper 282 or at 284. The negative signal in line 308 triggers the "1" input of a bistable flip-flop 310.

A negative supply voltage is applied to terminal 312, and may be connected through switch 314 to the remaining terminals of switch 306 through resistor 316 and capacitor 324. Resistor 318 and capacitor 322 connect the junction between resistor 316 and capacitor 324 to ground, and resistor 320 connects the three connected terminals of switch 306 to ground.

Switch 306 is desirably part of the mode selector switch 224 shown in FIGS. 1 and 5. Switch 306 is shown in the position corresponding to the mode of operation in which both X and Y data are obtained automatically.

Switch 314 is a manually operated switch which provides a digitizing signal when closed.

When a negative signal appears in line 308, flip-flop 310 is triggered to a state such that line 326 is energized. The signal in line 326 is amplified by amplifier 328 and fed to an input of OR-gate 330. The output of OR-gate 330 is amplified by amplifier 332 and fed through line 334 to an input of AND-gate 336. The remaining terminal of AND-gate 336 receives a series of pulses from pulse generator 338, which may typically operate at 200 pulses per second.

The output of AND-gate 336 is fed through inverter 340 to an input of a first binary flip-flop 342 of a cascaded series of flip-flops 342 through 360. These flip-flops are of the well-known type having a single input connection arranged so that the states of the outputs are reversed upon each successive positive-going pulse. They are provided with resetting inputs connected so that, when a resetting pulse is applied, they switch to the "0" state so that the "1" output is de-energized and the "0" output, if it is used, is energized. The cascaded series of flip-flops forms a binary counter, and outputs are taken from various flip-flops in the series to perform control functions for the apparatus. Means are also provided for resetting the flip-flops in the series selectively. The control and resetting connections of the series of flip-flops will now be described with reference to the separate parts of the apparatus which are controlled thereby or which provide resetting signals.

The "1" output of flip-flop 344 is delivered through line 362, and through amplifier 364 to terminal 366. A "1" output of flip-flop 346 is similarly connected through line 368, and through amplifier 370 to terminal 372. The "0" output from flip-flop 346 is taken at line 374, and the outputs in lines 368 and 374 are always opposite each other. For example, when line 368 is in a "1" state, line 374 is in a "0" state. Line 374 is connected through amplifier 376 to terminal 378. The "0" output of flip-flop 348 is delivered through line 380, and through amplifier 382 to terminal 384.

Terminal 386 is connected to terminal 372, terminal 388 is connected to terminal 378, and terminal 390 is connected to terminal 366. The "1" output of flip-flop 348 is delivered through line 392 and through amplifier 394 to terminal 396. The outputs just described taken from flip-flops 344, 346 and 348 are used to control the sequential delivery of data to the recording circuit.

Figure 7:
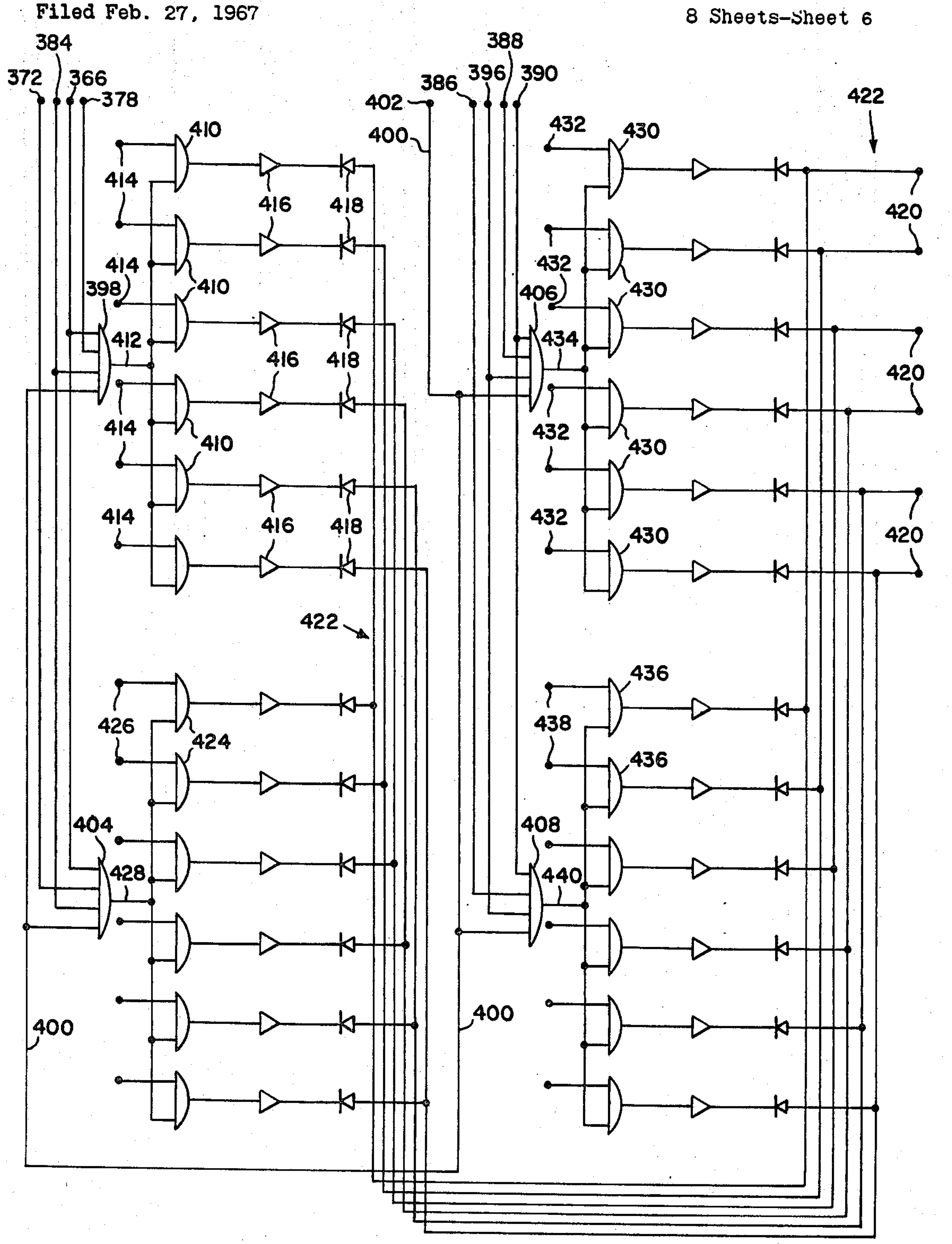
FIG. 7 is a schematic diagram of the logic circuitry which is used to deliver X and Y data sequentially to the write circuits.

Referring to FIGS. 6 and 7, the interconnections will be apparent from the duplicated numbering of the terminals. A four-terminal AND-gate 398 is shown receiving inputs from terminals 378, 366, 384 and from line 400, which is connected to the circuitry in FIG. 6 through terminal 402. Line 400 is normally energized during the sequencing operation of the circuit of FIG. 7.

A second four-terminal AND-gate 404 receives inputs from terminals 366, 384, 372 and from line 400. A third four-terminal AND-gate 406 receives inputs from terminal 390, 388, 396 and through line 400. A fourth four-terminal AND-gate 408 receives inputs from terminals 390, 396, 398 and through line 400.

Two-terminal AND-gates 410 are provided, and each has an input terminal connected to line 412 at the output of AND-gate 398. Each AND-gate 410 is provided with an input terminal 414, which is connected to receive X-data from one of lines 238 shown in FIG. 5 as the output of the mode selector switch 224. There are six terminals 414, and these are connected to receive the higher order X-data. The output of each AND-gate 410 is delivered through an amplifier 416, and through a diode 418 to a terminal 420 through one of lines 422.

A second group of AND-gates 424 receives lower order X-data at terminals 426 from lines 238. An input terminal of each AND-gate 424 is connected to the output line 428 of AND-gate 404. The outputs of AND-gates 424 are connected in the same manner as the outputs of AND-gates 410 to terminals 420.

AND-gates 430 receive higher order Y-data from lines 234 (shown in FIG. 5) at their input terminals 432. Each AND-gate 430 has a common terminal connected to receive gating signal through line 434 at the output of AND-gate 406. The outputs of AND-gates 430 are similarly connected to terminals 420.

AND-gates 436 receive lower order Y-data from lines 234 (shown in FIG. 5) at terminals 438. AND-gate 408 delivers a gating signal through line 440 to the common terminals of AND-gates 436. Again, the outputs are connected through amplifiers and diodes to terminals 420.

The circuit of FIG. 7 has only six outputs, and these are at terminals 420. The circuit of FIG. 7, acting in conjunction with flip-flops 344, 346 and 348 (in FIG. 6), delivers data to terminals 420 in a sequence such that higher order X-data appears at terminals 421, then lower order X-data, then higher order Y-data, and finally, lower order Y-data. This circuit allows the use of six tracks to record data rather than 24 tracks as would otherwise be required.

The sequencing operation is readily understood by considering the operation of flip-flops 344, 346, and 348 in FIG. 6 and the resulting conditions of AND-gates 398, 404, 406, and 408 in FIG. 7.

Assuming flip-flops 344, 346 and 348 each to be of originally in a "0" state so that lines 362, 368 and 392 are "0" while lines 374 and 380 are "1," only terminals 378, 388 and 384 are energized, and thus none of the four-terminal AND-gates is conductive. Again, line 400 will be assumed to be energized continuously. When flip-flop 344 changes state, lines 366, 378 and 384 are energized, and therefore gate 398 is rendered conductive. When another pulse is received at the input of flip-flop 344, only flip-flop 346 is in a "1" state, and none of the four-terminal AND-gates is conductive. When flip-flop 344 again changes state, both flip-flops 344 and 346 are in a "1" state, and terminals 366, 372, and 384 are energized. Consequently, gate 404 is rendered conductive. Following another instant when none of the gates is opened, gate 406 is rendered conductive as a result of the energization of lines 390, 388 and 396. Finally, AND-gate 408 is rendered conductive when flip-flops 344, 346 and 348 are all in the "1" state. It will be apparent that the sequencing operation just described requires 16 pulses from pulse generator 338.

Referring again to FIG. 6, a four-terminal AND-gate 442 is shown receiving inputs through amplifiers respectively connected to outputs of flip-flops 342, 344, 346 and 348. The arrangement is such that AND-gate 442 is rendered conductive when flip-flop 342 is in a "1" state while flip-flops 344, 346 and 348 are in a "0" state. Thus, AND-gate 442 only delivers an output when pulse generator 338 delivers its first pulse after the flip-flops are reset and before it delivers its second pulse. Outputs are taken from AND-gate 442, and delivered through amplifiers 444 and 446, respectively, to terminals 448 and 172. Terminal 172 is shown in FIG. 3 in the connection with an input terminal of each of AND-gates 174. Terminal 448 is similarly connected to a plurality of AND-gates (not shown) in a set gate 140 (shown only in the block diagram of FIG. 1).

The set gates are opened momentarily during each "write" cycle in order that their associated flip-flops (flip-flops 178 in FIG. 3) may be set selectively according to the output of the associated encoder at that particular instant.

AND-gate 450 receives a first input from the "0" output of flip-flop 342 through amplifier 452. A second input to AND-gate 450 is taken from the "0" output of flip-flop 344 through the amplifier 454. A third input is taken from the "0" output of flip-flop 346 through amplifier 376 and a fourth input is taken from the "0" output of flip-flop 348 through amplifier 382. A fifth input is taken through line 456 and through amplifier 458 from the "0" output of flip-flop 460. The output of AND-gate 450 is delivered through amplifier 462 and through diode 464 to line 466 which connects the resetting inputs of the flip-flops 350, 352, 354, 356, 358 and 360 of the cascaded binary counter. A negative pulse at line 466 causes the flip-flops to reset to their "0" state. Diode 468 blocks negative pulses, and prevents flip-flops 342, 344, 346 and 348 from resetting when a negative pulse appears at the output of amplifier 462 when flip-flop 310 is in its "0" state. The output of AND-gate 450 is also connected through amplifier 462 and through capacitor 470 to line 472 which is connected to a "0" input of flip-flop 310.

Line 472 is connected to ground through the parallel combination of resistor 474 and a diode 476 which short-circuits positive pulses at the output side of capacitor 470 to ground. AND-gate 450 provides a "write stop signal" when flip-flops 342–348 are in a "0" state and flip-flop 460 is in the "0" state. The "write stop signal" causes resetting of flip-flops 350–360 and causes the write control flip-flop 310 to be reset.

The "0" output of flip-flop 310 is delivered through capacitor 478 and through amplifier 480 and diode 482 to lines 484 and 486. A resistor 488 is provided between the input of amplifier 480 and ground, and resistor 490 is provided between the junction of lines 484 and 486 and ground. Line 484 is connected to the reset terminals of flip-flops 342, 344, 346 and 348 and through diode 468 to the remaining flip-flops in the counter comprising flip-flops 342 through 360. When flip-flop 310 is switched to its "0" state by a pulse through line 472 resulting from the energization of AND-gate 450, a pulse is produced in line 484 which causes resetting of all of the flip-flops in the counter comprising flip-flops 342 through 360. Any further energization of AND-gate 450 which takes place while flip-flop 310 is in its "0" state will cause flip-flops 350 through 360 to be reset by a pulse delivered through diode 464 to line 466. Under these conditions, flip-flops 342 through 348 are prevented from being reset by isolating diode 468.

A pulse is derived from flip-flop 344 when it is in its "1" condition and is delivered through amplifier 364 and through line 492 to an input of flip-flop 494. The "1" and "0" outputs of flip-flop 494 are delivered respectively through lines 496 and 498 to inputs of flip-flops 500 and 502. A resetting input for each of flip-flops 494, 500 and 502 is derived from line 484 through line 504. The outputs of flip-flops 500 and 502 are connected to inputs of motor driving circuitry contained within blocks 506 and 508. The circuitry within blocks 506 and 508 is fully described in the copending application of John D. Bennett, Preston E. Chaney, Jack Weir Jones and Stanley B. McCaleb, Ser. No. 404,091, filed Oct. 15, 1964, now Pat. No. 3,353,020, issued Nov. 14, 1967, with reference to FIGS. 5 and 6 of that application. This circuitry is primarily for the purpose of amplification, and is used to drive a stepping motor, the field windings of which are indicated at 510 and 512. The stepping motor is of the type known commercially as a SLO-SYN motor. The shaft of a motor of this type steps approximately 1.8° each time the polarity in its field windings is reversed.

This motor is used to drive the recording tape of the apparatus, and it will be apparent that accurate positioning of the tape will be accomplished in response to the pulses derived from flip-flop 344 in the counter.

A negative supply voltage is supplied to terminal 514, and supplies current through switch 516 to line 518 which is connected to diode 520, and through resistor 522 to the "1" input of flip-flop 460. A by-pass capacitor 524 is connected between the "1" input of flip-flop 460 and ground. A negative supply voltage at terminal 526 is arranged to be connected through switch 528, and through resistor 522 to the "1" input of flip-flop 460.

A first input to AND-gate 530 is received through switch 516, and through an inverter element 532, the output of which energizes the corresponding input of AND-gate 530 when switch 516 is open. The other input of AND-gate 530 is derived from the "0" output of flip-flop 360 through line 534. The output of AND-gate 530 is connected through amplifier 536 and through capacitor 538 to the "0" input of flip-flop 460. The "0" input of flip-flop 460 is grounded through resistor 540 and diode 542.

Closure of switch 516 causes flip-flop 460 to switch to its "1" state whereby an output is delivered through amplifier 544 and through OR-gate 330 and amplifier 332 to line 334, which enables gate 336 to deliver pulses to be counted to the cascaded series of flip-flops. It will be apparent that the motor drive circuitry will receive pulses through line 492 from flip-flop 344, which is the second flip-flop in the series. The tape drive motor will continue to rotate until switch 516 is opened and flip-flop 360 is in its "0" state, these two conditions being necessarily simultaneously present. Under these conditions, both input terminals of AND-gate 530 will be energized, and a pulse will be passed to the "0" input of flip-flop 460 through amplifier 536 and through capacitor 538. Flip-flop 460 will, at this time, revert to its "0" state, and, assuming flip-flop 310 to be in its "0" state, AND-gate 336 will be closed and the tape drive motor will cease to rotate. Thus, by closure of switch 516, the tape can be advanced manually.

A momentary closure of switch 528 will cause energization of the tape drive motor for a short period of time until flip-flop 360 returns to its "0" state, at which time AND-gate 530 will be energized through line 534, and a pulse will be delivered through amplifier 536 and through capacitor 538 to cause flip-flop 460 to return to its "0" state to stop the motor. It will be seen from a later description that closure of switch 528 will cause a parity signal to appear on the tape, and this signal will provide an indication on the tape of the end of a record.

The "1" output of flip-flop 460 is connected through amplifier 546 to an input of two-terminal AND-gate 548, which receives its other input through line 550 from the output of flip-flop 350 through amplifier 552. The output of AND-gate 548 is delivered through OR-gate 554 and through amplifier 556 to terminal 558 which connects to the correspondingly numbered terminal in FIG. 8 which will be described presently.

The "0" output of flip-flop 460 is amplified by amplifier 560 and is delivered through line 400 to terminal 402 which is correspondingly numbered in FIG. 7. The "0" output of flip-flop 460 is also connected through capacitor 562 and through amplifier 564 and diode 566 to an input of OR-gate 554. The output of amplifier 564 is delivered through diode 568, through line 486, and through line 484 to the resetting connections for flip-flops 342 through 348, and through diode 468 to line 466 which is a common connection for the resetting terminals of flip-flops 350 through 360. The output of amplifier 564 is connected through diode 568 to terminals 574 and 180, respectively. Terminal 180 is correspondingly numbered in FIG. 3, and is a resetting connection for flip-flops 178 of the X-data input network. Terminal 574 connects similarly to resetting connection for corresponding flip-flops in the Y-data input network which is not illustrated. Diode 576 connects the output of amplifier 564 to a resetting terminal of flip-flop 310 through line 578. A pulse in line 578 causes flip-flop 310 to switch to its "0" state.

Switch 580 connects a negative supply terminal 582 to the input of amplifier 564 through diode 584 and to a resetting terminal of flip-flop 460 through diodes 584 and 586. Switch 580 also connects the negative supply to terminal 588 which is correspondingly numbered in FIG. 9.

Terminal 594 is connected through line 596 to the output of amplifier 452 which receives the "0" output of flip-flop 342. Terminal 598 receives the output of amplifier 328 through line 600. Terminal 602 is connected to line 492, which is energized through amplifier 364 when flip-flop 344 is in the "1" condition.

Figure 8:
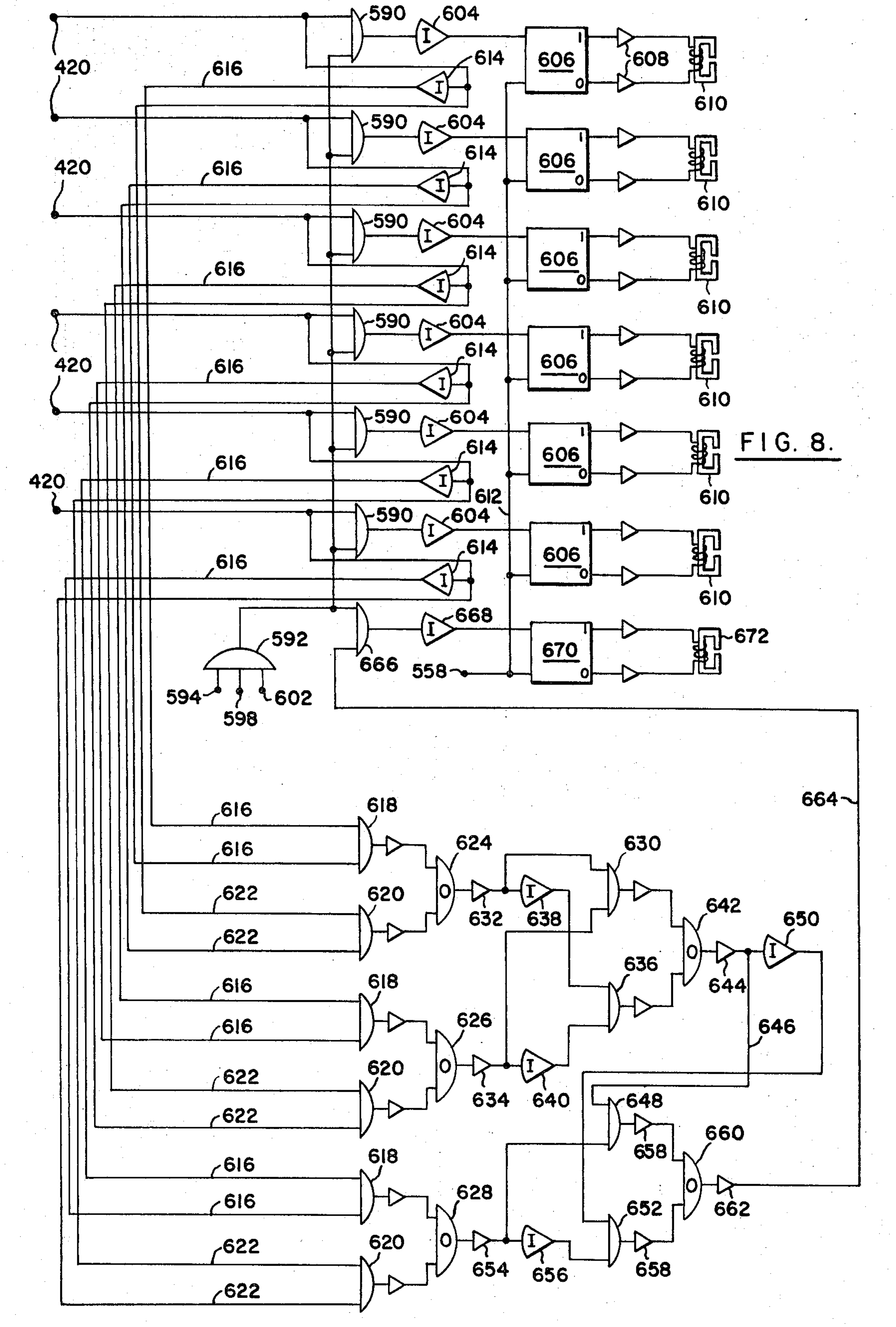
FIG. 8 is a schematic diagram of the write and recording circuits, and of a parity generating circuit.

Referring to FIG. 8, terminals 420 are shown which receive data in six-bit binary form from the sequencing circuit of FIG. 7. Each of terminals 420 is connected to an input terminal of a corresponding AND-gate 590. The remaining input terminals of AND-gate 590 are connected in common to the output of AND-gate 592. AND-gate 592 receives inputs from terminals 594, 598 and 602 which are correspondingly numbered in FIG. 6. When each of these terminals is energized, AND-gate 590 are enabled to deliver data through inverters 604 to inputs of flip-flop 606. These flip-flops are of the same type as flip-flops 342 through 360. Each pulse delivered to an input of one of them from an inverter 604 causes its state to be reversed. The outputs of flip-flop 606 are amplified by amplifiers 608 and connected to energize recording heads 610 in such a way that the magnetic state of a tape channel adjacent a recording head 610 is changed if the state of the associated flip-flop 606 is reversed. Resetting terminals of flip-flops 606 are connected through line 612 to a resetting terminal of flip-flops 670 and to terminal 558, which is correspondingly numbered in FIG. 6.

Inverters 614 receive inputs from terminals 420, and deliver outputs through lines 616 to AND-gate 618. Terminals 420 are connected directly to inputs of AND-gates 620 through lines 622. AND-gates 618 and 620 are paired and provide inputs for OR-gates 624, 626 and 628 through suitable amplifiers. AND-gate 630 receives inputs from the outputs of OR-gates 624 and 626 through amplifiers 632 and 634. AND-gate 636 receives the outputs of inverters 638 and 640, which receive the outputs of amplifiers 632 and 634, respectively. OR-gate 642 receives the amplified outputs of AND-gates 630 and 636 and delivers an output through amplifier 644 and line 646 to an input of AND-gate 648. The output of amplifier 644 is also inverted by inverter 650 and delivered to an input of AND-gate 652. AND-gate 648 receives its other input from OR-gate 628 through amplifier 654, and AND-gate 652 receives its other input from the output of amplifier 654 through inverter 656. The outputs of AND-gates 648 and 652 are amplified by amplifiers 658 which provide inputs for OR-gate 660. The output of OR-gate 660 is amplified by amplifier 662, and is fed, through line 664 to an input of AND-gate 666, which receives its other input from AND-gate 592. The output of AND-gate 666 is delivered through inverter 668 to an input of flip-flop 670, which is connected to control a seventh recording head 672 by connections similar to those for recording heads 610.

The apparatus of FIG. 8 sequentially records six-bit lines of data on a recording tape passing heads 610 and 672. AND-gates 590 and 666 are enabled when terminals 594, 598 and 602 are simultaneously energized to enable AND-gate 592. For each line of data, all of AND-gates 590 and 666 are enabled. Flip-flops 606 and 670 are selectively switched depending on the energization of terminals 420 and of line 664. Recording head 672 provides a parity track on the recording tape, and a parity signal is derived from the data delivered to terminals 420 and delivered to line 664 which controls the energization of the parity recording head 672. After each line of data is recorded, flip-flops 606 and 670 are rest by the energization of terminal 558 by the control circuitry of FIG. 6.

The circuitry which produces a parity signal from the data operates in the following manner:

Considering OR-gates 624 and 626, if their outputs are similar, for example, both "1's" or both "0's", the output of OR-gate 642 will be "1" because one or the other of AND-gates 630 and 636 will be enabled. If the outputs of OR-gates 624 and 626 are dissimilar, the output of OR-gate 642 will be "0." It will be noted that the logic which makes this comparison is similar to the circuit shown in FIG. 10.

The output of OR-gate 642 is similarly compared with the output of OR-gate 628, and the output of OR-gate 660 is "1" only if the outputs of OR-gates 642 and 628 are similar. Considering OR-gates 624, 626 and 628, it will be readily apparent that a "1" signal will appear in line 664 only if the outputs of one or three of these OR-gates is "1." If "1's" appear in the outputs of zero or two of these OR-gates, the signal in line 664 will be "0." In other words, the number of these OR-gates providing a "1" output must be odd if the signal in line 664 is to be a "1." A similar comparison is made between the signals in three adjacent pairs of terminals 420 such that if the adjacent terminals of a pair are energized similarly, the associated OR-gate 624 will produce a "1" output. Thus, if an odd number of terminals 420 are in a "1" state, the number of OR-gates 624, 626 and 628 producing a "1" output will be even, and a "0" will be generated in line 664. If the number of terminals 420 which are in a "1" state is even, an odd number of OR-gates 624, 626 and 628 will be energized, and the signal in line 664 will be a "1."

This circuitry writes a parity signal on the recording tape during each "write" operation so that a comparison can be made in the apparatus which eventually operates on the data contained on the tape in order to check for failure of the electrical components in the recording circuitry and other failures of the system.

Figure 9:
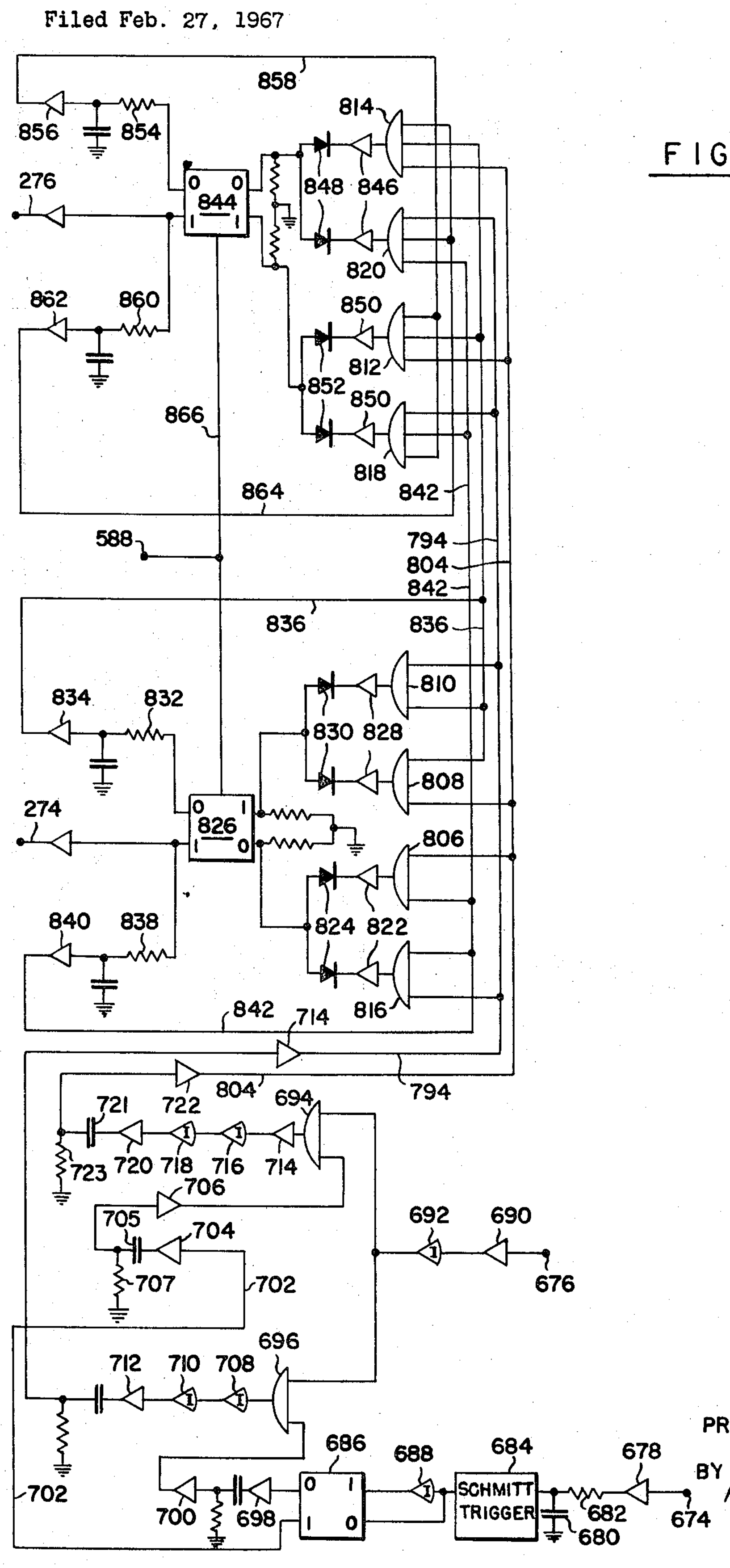
FIG. 9 is a schematic diagram of the circuitry providing an extension of range for the X-data.

Referring to FIG. 9, terminals 674 and 676 are shown. These are correspondingly shown in FIG. 3 as connected to the highest and second highest order outputs of the X-encoder delivered to terminals 150 and 152, respectively. The highest order output is delivered from terminal 674 through amplifier 678 and through an integrating network comprising capacitor 680 and resistor 682 to the input of a Schmitt trigger 684. The output of Schmitt trigger 684 is delivered directly to the "0" input of flip-flop 686 and through inverter 688 to its "1" input.

The second highest order X-digit is delivered from terminal 676 through amplifier 690 and inverter 692 to inputs of AND-gates 694 and 696, respectively. The "0"

output of flip-flop 686 is delivered through amplifiers 698, a differentiating network and through amplifiers 700 to the other input of AND-gate 696, and the "1" output of flip-flop 686 is delivered through line 702 and amplifiers 704 and 706 to the second input of AND-gate 694. A differentiating network comprising capacitor 705 and resistor 707 is interposed between amplifiers 704 and 706. The output of AND-gate 696 is delivered through a pair of inverters 708 and 710 and through amplifier 712, a differentiating network and through amplifier 714 to line 794. The output of AND-gate 694 is delivered through amplifier 714, inverters 716 and 718, amplifier 720 and amplifier 722 to line 804. A differentiating network comprising capacitor 721 and resistor 723 is connected between amplifiers 720 and 722.

Line 804 is connected to an input of each of two-terminal AND-gates 806 and 808, and to an input of each of three-terminal AND-gates 812 and 814. Line 794 is connected to an input of each of two-terminal AND-gates 816 and 810 and to an input of each of three-terminal AND-gates 816 and 810 and to an input of each of three-terminal AND-gates 818 and 820.

The outputs of AND-gates 816 and 806 are connected through amplifiers 822 and through isolating diodes 824 to the "0" input of flip-flop 826. Outputs of AND-gates 808 and 810 are likewise connected through amplifiers 828 and isolating diodes 830 to the "1" input of flip-flop 826.

The "0" output of flip-flop 826 is connected through through resistor 832 and amplifier 834 to line 836, which connects to inputs of AND-gates 808, 810, 812, and 814. The "1" output of flip-flop 826 is connected through resistor 838 and through amplifier 840 to line 842 which connects to inputs of AND-gates 806, 816, 818 and 820.

The outputs of AND-gates 814 and 820 are connected to the "0" input of flip-flop 844 through amplifiers 846 and diodes 848. The outputs of AND-gates 812 and 818 are likewise connected to the "1" input of flip-flop 844 through amplifiers 850 and diodes 852.

The "0" output of flip-flop 844 is connected through resistor 854 and through amplifier 856 to line 858, which connects to inputs of AND-gates 812 and 818. The "1" output of flip-flop 844 is connected through resistor 860 and through amplifier 862 to line 864, which connects to inputs of AND-gates 820 and 814.

Resetting connections are provided on flip-flops 826 and 844 through line 866 which connects to terminal 588 to receive a resetting signal. Terminal 588 appears correspondingly in the control circuit of FIG. 6.

The circuitry shown in FIG. 9 functions to extend the range of X-data by counting the revolutions of the X encoder and providing two additional bits of data at lines 274 and 276, which are correspondingly shown in FIG. 5, and which connect to terminals of the mode selector switch 224. The circuitry consists of two parts, the first part being a pulse generator which produces pulses whenever the X encoder makes a transition between numerals zero and 1023, a pulse being transmitted to line 804 when the transition is in a downward direction (i.e. zero to 1023) and a pulse being delivered to line 794 when the transition is in an upward direction (i.e. 1023 to zero).

The operation of the circuitry producing these pulses is as follows:

When the X encoder rotates in the increasing direction, terminal 674 is unenergized during the first half of rotation, i.e. between numerals zero and 512, and is energized throughout the other half between the numerals 512 and 1023. The transition of the state of terminal 674 takes place between numerals 511 and 512 and between the numerals 1023 and zero.

Terminal 676 is energized between numerals 256 and 728, in the increasing direction, and is unenergized between numerals 728 and 256 in the increasing direction.

The result is that terminal 676 is unenergized when the state of terminal 674 changes during the transition upwardly between numerals 1023 and zero and downwardly between the numerals zero and 1023. Terminal 676 is energized during the upward and downward transitions of terminals 674 at numeral 512. No other transitions of the state of energization of terminal 674 are encountered except those at numerals 1023 and 512.

Because AND gates 694 and 696 are disabled when terminal 676 is energized, the transition at terminal 674 at numeral 512 has no effect at lines 794 and 804.

As the X encoder rotates in the increasing direction between the numerals 1023 and zero, terminal 674 becomes deenergized, and Schmitt trigger 684 delivers a pulse to the "0" input flip-flop 686, the "0" output of flip-flop 686 delivers a pulse through amplifier 698, and through the differentiating network and amplifier 700 to an input of AND-gate 696, the other input being energized. A pulse, indicating the upward transition is delivered from the output of AND-gate 696 and through amplifier 714 to line 794.

A further increase in the value of X past numeral 512 causes flip-flop 686 to switch back to its "1" state by a pulse delivered from Schmitt trigger 684 and through inverter 688 to its "1" input. A pulse is, at this time, delivered through line 702, and through amplifier 704, capacitor 705 and amplifier 706 to an input of AND-gate 694. The other input of AND-gate 694 is disabled at this time, and no output is produced. A further increase in the X value through numeral 1023 to zero causes an additional pulse to be delivered to line 794.

As the value of X decreases through the numeral zero, flip-flop 686 is switched to its "1" state whereby a pulse is delivered through line 702, amplifier 704, capacitor 705 and amplifier 706 to an input of AND-gate 694. The other input of AND-gate 694 is energized since terminal 676 is unenergized, and a pulse is delivered to line 804 indicating a downward transition. Further downward transitions through numeral zero to numeral 1023 similarly cause the production of pulses in line 804.

The remainder of the circuitry of FIG. 9 serves to count the pulses appearing in lines 794 and 804. The pulses in line 794 are added, and the pulses in line 804 are subtracted. Considering flip-flops 826 and 844 to be in their "0" states so that the outputs in lines 274 and 276 are "0," a first "up" pulse appearing in line 794 will be delivered to an input of AND-gate 810. The other input of AND-gate 810 is energized from the "0" output of flip-flop 826 through line 836. The output of AND-gate 810 is delivered through an amplifier 828 and a diode 830 to the "1" input of flip-flop 826, so that flip-flop 826 is switched to its "1" state whereby line 274 is energized from its "1" output. Line 842 is also energized through amplifier 840, and energizes an input terminal of AND-gates 816 and 806 and of AND-gates 820 and 818. The "0" output of flip-flop 844 is energized at this time, and energizes input terminals of AND-gates 812 and 818 through amplifier 856 and line 858. An additional "up" pulse in line 794 energizes the third input terminal of AND-gate 818, so that AND-gate 818 is enabled to energize the "1" input of flip-flop 844 through an amplifier 850 and a diode 852. Flip-flop 844 is switched to its "1" state and an output is delivered to line 276. The second "up" pulse also energizes a terminal of AND-gate 816, the other terminal of which is energized through line 842. AND-gate 806 delivers a pulse through its associated amplifier 822 and diode 824 to the "0" input of flip-flop 826, whereby flip-flop 826 is switched to its "0" state so that line 836 is again energized through its "0" output and line 274 becomes de-energized. Line 864 is energized at this time from the "1" output of flip-flop 844 through amplifier 862. Input terminals of AND-gates 820 and 814 are energized through line 864.

When the encoder again passes 1023 in the upward direction, a third pulse is delivered through line 794. This pulse enables AND-gate 810, and causes flip-flop 826 to switch to its "1" state. This pulse has no effect on flip-flop 844, since AND-gates 818 and 820 are disabled.

A "down" pulse in line 804 will enable AND-gate 806 to deliver a pulse to the "0" input of flip-flop 826, and line 274 will become unenergized. The "0" output of flip-flop 826 energizes line 836 at this time to energize an input terminal of AND-gate 814. A second terminal of AND-gate 814 is energized through line 864. A second "down" pulse in line 804 will enable gate 814 and flip-flop 844 will switch to its "0" state while flip-flop 826 switches to its "1" state by the enabling of AND-gate 808.

A further "down" pulse in line 804 will cause AND-gate 806 to be enabled to energize the "0" input of flip-flop 826 whereby flip-flops 826 and 844 are returned to their original "0" states. This last pulse has no effect on flip-flop 844 since AND-gate 812 is disabled.

It will be apparent from the foregoing that lines 274 and 276 will be selectively energized depending on the position of the X encoder in such a way that, throughout the first revolution, neither of lines 274 and 276 will be energized, during the second revolution, line 274 will be energized, during the third revolution, line 276 will be energized, and during the fourth revolution both lines will be energized. By this circuitry, the range of the ten-bit X encoder is extended by two binary bits. As a result, in the overall apparatus, the extent of movement of the tracking apparatus in the X direction is extended by a factor of 4. It will also be apparent that any pattern of passages of the 0 and 1023 points of the X encoder will be accommodated by this apparatus, and the conditions of lines 274 and 276 will correspond to the particular revolution of the X encoder.

The operation of the apparatus as a whole will be best understood from a discussion of the control circuitry, which is illustrated in FIG. 6.

Flip-flops 342 through 360 are in the reset state so that their "0" outputs are energized and their "1" outputs are unenergized at the beginning of operation. A digitizing signal is produced in line 308 as a result of rotation of the X-encoder when wiper 306 is in contact with contact 304, and as a result of manual closure of switch 314 if wiper 306 is in contact with any of its other associated contacts. In fully automatic operation, that is, when wiper 306 contacts 304, the frequency of the digitizing signal depends on the position of the scale selector switch comprising wipers 282 and 284. The digitizing signal in line 308 causes flip-flop 310 to switch to its "1" state, and an input of OR-gate 330 is energized so that line 334 transmits a signal enabling AND-gate 336.

Pulse generator 338 continuously delivers pulses, and, when AND-gate 336 is enabled, the binary counter comprising flip-flops 342 through 360 begins to operate.

When flip-flop 342 receives a first pulse, it switches to its "1" state, and the four-input AND-gate 442, three of its inputs being energized by "0" outputs of flip-flops 344, 346 and 348, becomes enabled by the "1" output of flip-flop 342, and delivers a signal to terminal 172 which enables AND-gates 174 (FIG. 3) momentarily so that flip-flops 178 are selectively switched according to the energization of terminals 150 through 168 by the output of the X-encoder. Similar AND-gates are associated with the Y-encoder, and are enabled through terminal 448 at this time. AND-gate 442 is only enabled when flip-flop 342 is in a "1" state and flip-flops 344, 346, and 348 are in the "0" state. AND-gate 442 is only enabled during the period following the first pulse received by flip-flop 342 and before a second pulse is received. Consequently, after the second pulse is received by flip-flop 342, there can be no interference with the data stored in flip-flops 178 (FIG. 3) and corresponding flip-flops associated with the Y-encoder until after flip-flops 342 through 348 are reset and a further pulse is delivered through AND-gate 336.

Terminals 184, 190 and 194 (FIG. 3) and corresponding terminals (not shown) of the code translator 134 (FIG. 1) are selectively energized in the standard binary system to represent the positions of the X and Y encoders. Terminals 432, 438, 414 and 426 (FIG. 5) are correspondingly energized through mode selector switch 224 when the mode selector switch is in the fully automatic position, that is, the position shown.

Referring to FIGS. 6 and 7, the operation of flip-flops 344 through 348 to count pulses delivered from AND-gate 336 causes terminals 420 (FIG. 7) to be sequentially energized in four steps, first from terminals 414, then from terminals 426, then from terminals 422, and finally, from terminals 438 in the manner described previously. During each of these steps, pulses from the "1" output of flip-flop 344 are delivered through line 492 to operate the drive circuitry for the tape transport mechanism. The tape is advanced four times during each "write" cycle so that four separate lines of information are recorded on the tape.

Referring to FIGS. 6 and 8, terminal 598 of AND-gate 592 is energized from the "1" output of flip-flop 310, which is energized continuously during the "write" cycle. Terminals 594 and 602 are energized from flip-flops 341 and 344 so that AND-gate 592 is enabled only when flip-flop 342 is in the "0" state while flip-flop 344 is in the "1" state.

The signals at terminals 420 are continuously delivered through lines 616 and 622 to the parity logic circuitry, but the output of the parity logic in line 664 is only permitted to be recorded when AND-gate 592 is enabled. Flip-flops 606 and 670 do not have to be reset at the end of each "write" operation. Any signal delivered by an inverter 604 or 668 to one of these flip-flops will cause it to change state, and, so far as the magnetic tape is concerned, it is this change which is of significance, and not whether the flip-flop is in a "1" or "0" state. Therefore, if, during a "write" operation, a flip-flop does not change state, the corresponding track on the tape is not affected. At the end of each "write" cycle, when flip-flops 342, 344, 346 and 348 return to the "0" state, AND-gate 450 is enabled. A pulse is produced in line 470 which causes flip-flop 310 to be switched to its "0" state. A negative pulse is produced at the "0" output of flip-flop 310, and is delivered through line 484 to the resetting terminals of flip-flops 342 through 348, and through diode 468 and line 366 to the resetting terminals of flip-flops 350 through 360. Terminals 180 and 574 receive pulses at this time through line 486. Terminal 180 (FIG. 3) is a resetting connection for flip-flops 178, and terminal 574 is a resetting connection for corresponding flip-flops (not shown) associated with the Y-encoder.

The motor control flip-flops 494, 500 and 502 are reset through line 504.

The operations which take place during the normal "write" cycle have been described. A further digitization signal produced either manually by closure of switch 314, or automatically by a change in the value of X to the extent of two or four depending on the positions of wipers 282 and 284 of the scale selector switch, initiates another "write" cycle.

Other operations of the control circuit of FIG. 6 will now be described.

After a particular chart has been traced by the apparatus, it is desirable to provide an indication on the tape that that particular record has been completed. This is accomplished by momentary closure of switch 528, which causes a signal to be delivered to the "1" input of flip-flop 460 to switch it to its "1" state. A signal is delivered through amplifier 544, through OR-gate 330, amplifier 332 and line 334 to AND-gate 336 so that flip-flops 342 through 360 begin to count pulses produced by pulse generator 338. Alternation of flip-flop 344 causes pulses to be delivered through line 494 to the motor drive circuitry to cause the tape to be advanced. Flip-flop 310 is in its "0" state at this time, and no signal is delivered through line 600 to gate 592 (FIG. 8) so that no change can be made of the state of flip-flops 606 and 670 (FIG. 8). A parity signal is generated on the tape when flip-flop 350 switches to its "1" state since AND-gate 548 is enabled through line 550, and a signal appears at terminal 558 which causes flip-flops 606 and 670 (FIG. 8) to be reset. The "0" output of flip-flop 360 eventually goes from an unenergized state to an energized state, at which time a signal is delivered through line 534 to an input of AND-gate 530, the other input of which is energized by the output of inverter 532 when switch 516 is open. A signal is delivered through amplifier 536 and capacitor 538 to the "0" input of flip-flop 460 causing it to be reset to its "0" state. A parity signal appears on the tape a short distance past the last recorded data line, and the tape is stopped a short distance past the point at which the parity signal appears.

The tape can be advanced manually by closure of switch 516 thereby causing a signal to be passed through line 518, diode 520 and resistor 522 to trigger flip-flop 460 to its "1" state. A signal from the "1" output of flip-flop 460 passes through amplifier 544 and through OR-gate 330, amplifier 332 and line 334 to enable AND-gate 336 to deliver pulses to the cascaded flip-flops. Switching of flip-flop 344 causes a motor driving signal to be passed through line 492 to the motor driving circuitry. If switch 516 is held closed, the tape transport motor will continue to run. If switch 516 is opened, AND-gate 530 is enabled through inverter 532, and when flip-flop 360 switches from "1" to "0," a signal is passed through line 534 to enable AND-gate 530, and a pulse is passed through capacitor 538 to switch flip-flop 460 back to "0." The tape transport motor therefore stops shortly after switch 516 is opened. No data is recorded during the advancing of the tape since flip-flop 310 is in the "0" state and AND-gate 592 (FIG. 8) is consequently disabled. The four-terminal AND-gates 398, 404, 406 and 408 (FIG. 7). are disabled during the manual advance of the tape since flip-flop 460 is in the "1" state and line 400 is unenergized.

When flip-flop 460 returns to its "0" state after manual advance of the tape or after switch 528 is closed, a pulse is passed through capacitor 562, amplifier 564 and diode 568 and through lines 486 and 484 to reset each of flip-flops 342 through 360 to "0." Flip-flops 178 (FIG. 3) and corresponding flip-flops associated with the Y-encoder are reset through terminals 574 and 180. Flip-flops 494, 500 and 502 of the motor drive circuitry are reset through line 504. A resetting pulse is delivered through diode 576 and line 578 to insure that flip-flop 310 is in the "0" state.

All of the circuits which were reset by a pulse passed through capacitor 562 are reset by a momentary manual closure of switch 580, since a negative pulse is passed through diode 584 to the input of amplifier 564. Flip-flop 460 is reset through diode 586. In addition, flip-flops 844 and 826 (FIG. 9) of the two-stage counter are reset through terminal 588 and line 866 to their "0" states so that neither of lines 274 and 276 is energized. Diode 584 isolates the resetting connection of flip-flops 844 and 826 so that they are not reset when flip-flop 460 switches from "1" to "0" following the closure of switch 528 at the end of the production of a record or following a manually initiated advance of the tape by closure of switch 516.

Various advantages in the nature of flexibility of operation and simplicity of construction are realized from the important aspects of the invention summarized below.

The digitization signal, i.e., the signal which causes the initiation of a "write" cycle is derived from the X-encoder so that, when the value of X changes, recording of the new values for X and Y is accomplished automatically. The frequency of occurrence of the digitization signal is selectable so that a digitization signal may be produced, if desired, when the value of X changes by two (in the decimal system), or when it changes by four. It will be apparent that the circuitry can be readily modified so that the digitization signal may be made to occur at other frequencies. Alternatively, the digitization signal can be initiated manually.

The apparatus records X and Y data in four separate "write" operations during a "write" cycle. This sequential operation permits a high degree of resolution in data recorded on a limited number of tracks on a recording tape.

By operating the tape transport mechanism by pulses derived from the source providing gating pulses to gates supplying information to the recording apparatus, exact positioning of the lines of information on the recording tape is assured. The indication produced on the tape that a record has been completed appears at an exact position with respect to the last recorded line of information, and the tape is stopped at an exact distance past the last recorded line of information. The tape may be advanced by manual actuation of switch 516, by which pulses are continuously delivered to the driving circuitry for the tape transport mechanism, but the tape is only permitted to stop at certain particular positions corresponding to a switching of the last flip-flop in the binary counter.

The invention provides for the extension of the normal range of a shaft encoder by counting its revolutions.

A selector switch permits either X or Y data to be inserted manually while the other is obtained from the output of a shaft encoder. Alternatively, both X and Y data can be inserted manually.

The X and Y data are delivered through gates to switch flip-flops selectively, after which the gates are disabled to prevent further switching of the flip-flops until the beginning of the next "write" cycle.

It will be apparent that various modifications may be made to the invention with regard to the range of data capable of being handled and with regard to other of its aspects, without departing from its scope as defined in the following claims.

What is claimed is:

1. An apparatus for recording analog data in digital form comprising means selectively energizing a plurality of outputs, counting means, a source of pulses, means controlling said source of pulses to deliver pulses to the input of said counting means, recording means, controllable gating means connected to deliver all of the signals from said plurality of outputs to said recording means, means receiving the output of said counting means and responsive to the count of said counting means for controlling said gating means to deliver signals from said plurality of outputs in sequentially selected groups to said recording means as said counting means counts pulses, said means controlling said source of pulses including means receiving at least one of the outputs of said plurality of outputs and responsive to a change in the energization of said one of said outputs for controlling said source of pulses to deliver pulses to said counting means when said change occurs.

2. An apparatus according to claim 1 including switching means receiving at least two of said outputs of said plurality of outputs and in which said means receiving at least one of said outputs receives said one of said outputs through said switching means.

3. An apparatus for recording analog data in digital form comprising means selectively energizing a plurality of outputs, counting means, a source of pulses, means controlling said source of pulses to deliver pulses to the input of said counting means, recording means, controllable gating means for delivering signals from said plurality of outputs to said recording means, means receiving the output of said counting means and responsive to the count of said counting means for controlling said gating means to deliver signals from said plurality of outputs to said recording means when said counting means counts a predetermined number of pulses, said means selectively energizing a plurality of outputs including a pair of electro-mechanical encoders, said controllable gating means including gates in at least two groups, one of said groups being connected to receive a first group of said outputs, and the other of said groups being connected to receive a second group of said outputs, said means controlling said source of pulses including means receiving at least one of the outputs of one of said encoders, and responsive to a change in the energization of said one of said outputs to control said source of pulses to deliver pulses to said counting means when said change occurs and said means responsive to the count of said counting means including means enabling the gates of one of said groups at a first predetermined count of said counting means and enabling the gates of the other of said groups at a second predetermined count of said counting means.

4. An apparatus for recording analog data in digital form comprising means selectively energizing a plurality of outputs, counting means, a source of pulses, means controlling said source of pulses to deliver pulses to the input of said counting means, recording means, controllable gating means for delivering signals from said plurality of outputs to said recording means, means receiving the output of said counting means and responsive to the count of said counting means for controlling said gating means to deliver signals from said plurality of outputs to said recording means when said counting means counts a predetermined number of pulses, said gating means including at least two AND-gates receiving, at their inputs, outputs from stages of said counting means, and a first group of gates receiving a first group of outputs of said plurality of outputs and a second group of gates receiving a second group of outputs from said plurality of outputs, said first group of gates being connected to receive controlling signals from the first of said AND-gates and controlled to deliver signals to said recording means when the first of said AND-gates is enabled, and said second group of gates being connected to receive controlling signals from the second of said AND-gates and controlled to deliver signals to said recording means when the second of said AND-gates is enabled.

5. An apparatus for recording analog data in digital form comprising means selectively energizing a plurality of outputs, counting means, a source of pulses, means controlling said source of pulses to deliver pulses to the input of said counting means, recording means, controllable gating means for delivering signals from said plurality of outputs to said recording means, means receiving the output of said counting means and responsive to the count of said counting means for controlling said gating means to deliver signals from said plurality of outputs to said recording means when said counting means counts a predetermined number of pulses, said means selectively energizing a plurality of outputs including at least one electro-mechanical encoder having a plurality of output terminals, gating means receiving signals from said output terminals, information storage means connected to receive the outputs of said gating means and providing said plurality of outputs, second means receiving the output of said counting means and enabling said gating means receiving signals from said output terminals when said counting means counts a second predetermined number of pulses and means receiving the output of said counting means and erasing the information stored in said information storage means when said counting means counts a third predetermined number of pulses.

6. Apparatus for recording data comprising
means having at least three parallel outputs and selectively energizing combinations of said outputs in a parallel binary code signifying the values of one or more variables,
recording means, cyclically operable means for selecting all of said outputs in sequentially selected groups and connected to deliver the selected groups in time sequence to said recording means, and
means, connected to receive at least one of the outputs of said means having at least three outputs, for detecting changes of a predetermined character in said variables and initiating operation of said cyclically operable means through a cycle whenever one of said changes occurs.

7. Apparatus for recording data comprising
means having at least three parallel outputs and selectively energizing combinations of said outputs in a parallel binary code signifying the values of one or more variables,
recording means,
cyclically operable means for selecting all of said outputs in sequentially selected groups and connected to deliver the selected groups in time sequence to said recording means, and
means connected to receive one of said outputs, and responsive to a change in the energization of said one of said outputs, for initiating operation of said cyclically operable means through a cycle whenever said change occurs.

8. Apparatus according to claim 7 wherein said means having at least three outputs includes at least one electro-mechanical binary shaft encoder.

9. Apparatus according to claim 7 including switching means for connecting said means for receiving one of said outputs alternatively to one or another of said outputs for varying the resolution of the recorded data.

10. Apparatus for recording data comprising
means having at least three parallel outputs and selectively energizing combinations of said outputs in a parallel binary code signifying the values of one or more variables,
cyclically operable means for selecting all of said outputs in sequentially selected groups and connected to deliver the selected groups in time sequence to recording means,
recording means connected to receive said selected groups and having an indexable recording medium for recording said selected groups, and
means connected to receive one of said outputs, and responsive to a change in the energization of said one of said outputs, for initiating operation of said cyclically operable means through a cycle whenever said change occurs and for effecting indexing of said recording medium each time a selected group is delivered to said recording medium.

References Cited

UNITED STATES PATENTS

| | | | |
|---|---|---|---|
| 2,729,774 | 1/1956 | Steele | 235—92X |
| 2,931,689 | 4/1960 | Dupy | 346—33X |
| 2,933,364 | 4/1960 | Campbell | 340—347 |
| 2,952,012 | 9/1960 | Rodgers et al. | 340—347 |
| 3,104,147 | 9/1963 | Whittle et al. | 340—347 |
| 3,244,369 | 4/1966 | Nassimbene | 235—92X |
| 3,251,039 | 5/1966 | Dupy et al. | 346—33UX |
| 3,298,015 | 1/1967 | Herman | 340—347 |
| 3,370,289 | 2/1968 | Hedgecock et al. | 340—347 |

MAYNARD R. WILBUR, Primary Examiner

C. D. MILLER, Assistant Examiner

U.S. Cl. X.R.

346—33